US008832548B2

(12) United States Patent
Duga et al.

(10) Patent No.: US 8,832,548 B2
(45) Date of Patent: Sep. 9, 2014

(54) SYSTEM AND METHOD FOR SELECTIVE CONTROL OF ZOOM ADJUSTMENTS IN AN ELECTRONIC PUBLICATION

(75) Inventors: Brady Duga, Carlsbad, CA (US); Garth Conboy, La Jolla, CA (US); William Leshner, San Diego, CA (US); John Rivlin, Palo Alto, CA (US); Vincent Le Chevalier, San Jose, CA (US)

(73) Assignee: Google Inc., Mountain View, CA (US)

( * ) Notice: Subject to any disclaimer, the term of this patent is extended or adjusted under 35 U.S.C. 154(b) by 935 days.

(21) Appl. No.: 12/563,498

(22) Filed: Sep. 21, 2009

(65) Prior Publication Data

US 2011/0072390 A1    Mar. 24, 2011

(51) Int. Cl.
G06F 17/22    (2006.01)
G06F 3/048    (2013.01)
G06F 3/0481   (2013.01)
G06F 17/21    (2006.01)
G06F 17/30    (2006.01)

(52) U.S. Cl.
CPC ............ *G06F 3/0481* (2013.01); *G06F 17/211* (2013.01); *G06F 17/30905* (2013.01); *G06F 17/2247* (2013.01); *G06F 17/212* (2013.01); G06F 2203/04806 (2013.01)
USPC ........... 715/235; 715/251; 715/252; 715/270; 715/273; 715/276

(58) Field of Classification Search
CPC . G06F 3/0481; G06F 17/2247; G06F 17/211; G06F 17/30905
USPC .......... 715/235, 251, 252, 269, 273, 276, 800
See application file for complete search history.

(56) References Cited

U.S. PATENT DOCUMENTS 7,627,814 B1 *  12/2009  Soldan et al. ................. 715/236
2003/0095135 A1 *  5/2003  Kaasila et al. ............... 345/613

(Continued)

OTHER PUBLICATIONS

International Search Report Dated Dec. 22, 2010 for International Application No. PCT/US10/49633.

(Continued)

*Primary Examiner* — Tadeese Hailu
(74) *Attorney, Agent, or Firm* — Fenwick & West LLP

(57) ABSTRACT

A system and method for selective control of zoom adjustments in an electronic publication is disclosed. The method may include generating content for display on an electronic reading device; generating at least one style for the content, and storing the content and the at least one style on a computer readable medium. The generation of at least one style may include identifying at least a portion of the content for which at least one zoom level will be specified; specifying a base text size for the portion of the content; and specifying a first value to increment the base text size to a first zoom state text size. A method for rendering an electronic document on an electronic device may include storing content representing an electronic publication in a computer memory of the electronic device, the content including at least one style for a portion of the content, the at least one style including a base text size for the portion of the content and at least a first value to increment the base text size to a first zoom state text size; rendering the contents according to the at least one style; and incrementing the base text size for the portion of the content by the first value in response to a user input to zoom.

15 Claims, 6 Drawing Sheets

(56) References Cited

U.S. PATENT DOCUMENTS

| | | | |
|---|---|---|---|
| 2003/0187744 A1* | 10/2003 | Goodridge, Jr. | 705/26 |
| 2004/0103371 A1* | 5/2004 | Chen et al. | 715/513 |
| 2005/0198571 A1 | 9/2005 | Kramer et al. | |
| 2006/0195784 A1* | 8/2006 | Koivisto et al. | 715/523 |
| 2007/0079236 A1* | 4/2007 | Schrier et al. | 715/517 |
| 2007/0150829 A1* | 6/2007 | Eschbach et al. | 715/781 |
| 2008/0022197 A1* | 1/2008 | Bargeron et al. | 715/246 |
| 2008/0077880 A1* | 3/2008 | Oygard | 715/799 |
| 2008/0082911 A1 | 4/2008 | Sorotokin et al. | |
| 2008/0209533 A1* | 8/2008 | Abrams et al. | 726/9 |
| 2008/0235585 A1* | 9/2008 | Hart et al. | 715/717 |
| 2008/0301545 A1* | 12/2008 | Zhang et al. | 715/235 |
| 2009/0089448 A1* | 4/2009 | Sze et al. | 709/231 |
| 2009/0150766 A1 | 6/2009 | Fukuda et al. | |
| 2009/0189920 A1* | 7/2009 | Chiu et al. | 345/662 |
| 2009/0198767 A1* | 8/2009 | Jakobson et al. | 709/203 |
| 2009/0225086 A1 | 9/2009 | Tomida | |
| 2009/0319888 A1* | 12/2009 | Oygard | 715/252 |
| 2010/0315326 A1* | 12/2010 | Le Chevalier et al. | 345/107 |
| 2010/0325529 A1* | 12/2010 | Sun | 715/234 |

OTHER PUBLICATIONS

PCT International Preliminary Report and Written Opinion Mailed Apr. 5, 2012 for International Application No. PCT/US2010/049633.

* cited by examiner

Russia Cuts Gas; Europe Shivers

Pool photo by Alexei Druzhinin Prime Minister Vladimir V. Putin of Russia conferring Tuesday with the chief of Gazprom, Aleksei B. Miller. Gazprom said Ukraine had shut the gas pipeline. Ukraine denied it.

By ANDREW E. KRAMER

MOSCOW - Gazprom, the Russian gas monopoly, halted nearly all its natural gas exports to Europe on Tuesday, sharply escalating its pricing dispute with neighboring Ukraine. The cutoff led to immediate shortages from France to Turkey and underscored Moscow's increasingly confrontational posture toward the West.

Across Europe, countries reported precipitous drops in gas pressure in their pipelines at the peak of the winter heating season in a bitterly cold January.

In one sign of the extent of the shutoff, Ukraine's president, Viktor A. Yushchenko, said Gazprom intended to halt all shipments passing through his country, which account for about 80 percent of Russian gas exports to Europe.

FIG. 6

SYSTEM AND METHOD FOR SELECTIVE CONTROL OF ZOOM ADJUSTMENTS IN AN ELECTRONIC PUBLICATION

BACKGROUND INFORMATION

One of the benefits of using reflowable text (e.g., text that automatically wraps words to the next line as the user changes window size and thereby relocates the right margin of the page) in electronic publications is that display properties can be changed to suit a user's preferences. A common use of this control is to change the size of text when rendering the electronic publication. As the size of the text increases, words can be "forced" from the right margin to the next line.

Many electronic book ("eBook") applications limit the number of text sizes that a user may select to a fixed number (for instance, small, medium and large), although the actual number of potential text sizes may be much greater. This is because allowing users such control over the display of content causes a dilemma for those tasked with designing content—such as content creators and content editors—to be rendered. While certain areas of content may have no issues being viewed in multiple sizes, other areas of the same content may not be as simple to change. For example, an electronic newspaper may have a complex layout to the front page. While full article pages can easily be zoomed, a complex front page with multiple stories in small boxes may become entirely unreadable when text size is changed.

For such complex layouts, prior efforts have taken two approaches. The first is to simply forbid text size changes. An example of this approach is the Portable Document Format file format, or "PDF." Such an approach limits the usefulness of an electronic publication, by eliminating a desired feature. Producing multiple fixed-size documents to address user requirements (for instance a large print version for the visually impaired) is time-consuming, costly and creates problems for content distribution.

The other approach is to simply allow the user—the reader—full control over the content. While this approach can work, especially in an environment where the content is limited to a single "page" that can be scrolled, it does not work very well in complex layouts as all areas of a page may reflow.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which:

FIG. 6 is an example of a rendering of the content of FIG. 5 in response to a zoom instruction.

DETAILED DESCRIPTION OF PREFERRED EMBODIMENTS

Figure 1:
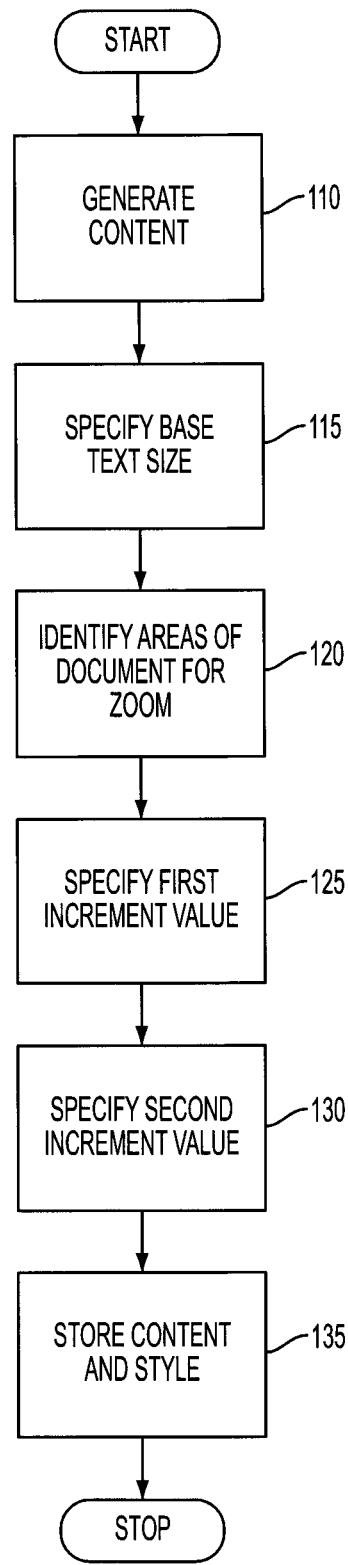
FIG. 1 is a flowchart depicting a method for selective control of zoom adjustments in an electronic publication according to one embodiment.

Several embodiments of the present invention and their advantages may be understood by referring to FIGS. 1-6, wherein like reference numerals refer to like elements.

According to one embodiment, the present invention provides electronic publication authors, content creators and/or content editors with the ability to select complex layouts for content while still providing the user with the ability to customize his or her reading experience. Specifically, in one embodiment, the user is provided with the ability to zoom generic content, e.g., the text of an electronic publication, with little or no restrictions imposed by the content creator/editor. Further, the content creator/editor may identify areas of content (e.g., titles, headers, footers, etc.) for which zooming is not permitted and/or restricted. In one embodiment, the default zoom behavior may be altered by changing the zoom increment for each zoom state. In one embodiment, the content creator may be able to easily specify changes to the allowed sizes for large (e.g., the entire document) and small portions (e.g., one paragraph) of the content.

Cascading Style Sheets, or "CSS," is a style sheet language that allows authors and users to attach style, such as fonts and spacing, to structured documents. CSS allows the separation of the presentation style of documents from the content of documents. The Cascading Style Sheets Level 2 Revision 1 (CSS 2.1) Specification is hereby incorporated by reference in its entirety.

According to one embodiment, a new CSS property, called "-shadowbox-zoom-deltas", provides the content author and rendering software rich control of text size across multiple zoom states. Like other CSS properties, -shadowbox-zoom-deltas inherits to child elements and participates in the cascade. In one embodiment, elements that descend from an element that has this property will have the same value for the property unless otherwise specified.

The syntax for this property is:

-shadowbox-zoom-deltas: [length|ems|exs]+ where length, ems and exs are as defined in the CSS specification.

In one embodiment, at least one value for length, ems, or exs must be provided. The value specifies the increment to add to the text size for the next zoom state. Thus, the first value specifies the amount to add or subtract to or from the base text size to get the value for the second zoom state. The second value is the amount to add or subtract to or from the second zoom state's total size to get the size of the third state. Additional values and zoom states may be provided as necessary and/or desired.

In one embodiment, the first value and/or the second value can have negative values. The negative first value will cause the text size to decrease in the first zoom state. Similarly, a negative second value will cause the text size to decrease in the second state.

For example, for a publication with three distinct zoom states (e.g., small, medium and large), and given these values:

-shadowbox-zoom-deltas: 2 pt 1 in;

if the original text had a font size of 12 points, the three zoom states would have the following values:

small: 12 pt medium: 14 pt (12 pt+2 pt)

large: 86 pt (14 pt+1 in=14 pt+72 pt)

In the event that there are more zoom states than specified sizes, the remaining states use the last increment value. Given the same three zoom states above, an element with this setting:

shadowbox-zoom-deltas: 2 pt;
Would have these sizes:
small: 12 pt
medium: 14 pt (12 pt+2 pt)
large: 16 pt (14 pt+2 pt)

In one embodiment, if there are more increments than zoom states, the remaining increments may be ignored.

The actual number of zoom states may be determined by, for example, the content creator, the user interface, the electronic reading device, etc.

In one embodiment, it may be desired to prevent an increment. To do this, 0 (zero, with or without a unit) may be supplied. For example, in the three zoom state case, to make the first and second states the same, but allow the third state to be 2 pt larger, the rule:

-shadowbox-zoom-deltas: 0 2 pt;

may be used.

In one embodiment, it may be desired to prevent zoom for a particular element, for example, in a repeating heading, footer, etc. The following may be used:

-shadowbox-zoom-deltas: 0 pt;

In one embodiment, because this property may inherit to child elements, the default zooming behavior for the entire electronic document may be altered with a single CSS rule.

For instance, to make all content zoom by 1 pt for every zoom state, the following CSS can be provided:

body {-shadowbox-zoom-deltas: 1 pt;}

In one embodiment, like any CSS property, shadowbox-zoom-deltas can be supplied in a separate style sheet, in the head section of a source document or directly on an element via the style attribute.

A specific block of text can have its size increment specified for every zoom state in a document. In addition, this increment can be applied to all remaining states. The increment can be any CSS value, including zero or negative values. This gives precise size control over elements at any zoom state.

Referring to FIG. 1, a method for selective control of zoom adjustments in an electronic publication according to one embodiment is disclosed. In step 110, content that is for display on an electronic display device is generated. Any sort of content may be provided. In one embodiment, an electronic publication may be provided. In another embodiment, an electronic book may be provided. In yet another embodiment, digital photographs may be provided. Any content that may be displayed for a user on an electronic display device may be used.

In one embodiment, the content may be provided from a third party, for example, a newspaper or book publisher, on-line publisher, etc. In another embodiment, the content may be generated at the same time that styles are identified.

In step 115, the base text size is specified. In one embodiment, the content may have multiple text sizes, and a selected portion may have multiple text sizes.

In step 120, at least one portion of the content that will have its zoom properties defined is identified. This may be any amount of the content, ranging from a small portion (e.g., a page number, title, etc.) to the entire content.

In step 125, a first increment value is set. In one embodiment, the first increment value may range from a negative increment size to a positive increment size specifying a desired increment size. If a negative value is set, the size of the text will decrease. If the value is set to zero, then the base text size will not be increased if the user attempts to zoom on the portion. If a positive value is set, the size of the text will increase. Other portions, however, that have a first increment set, will be zoomed by that value.

Any increment value may be used. In one embodiment, however, the size of the increments may range between 2 and 4 points.

In step 130, a second increment value may be set. In one embodiment, this is the additional amount over the first increment value. The second increment value may range from a negative value to a positive value specifying desired increment size. If the value is set to zero, then the base text size will not be increased beyond the first increment value if the user attempts a second zoom on the portion.

In one embodiment, if a second increment value is not set, then each successive zoom will increase the text size by the first increment value.

In one embodiment, the content creator/editor may specify the increment values for the content. In one embodiment, the content creator/editor may set a fixed number of zoom levels, ranging from one level (e.g., the base text size) to any desired number of levels. Therefore, although two increment values are described, a greater or fewer number of increment values may be used as necessary and/or desired.

Theoretically, there is no limit to the number of zoom states that may be used. Practically, however, the number of zoom states may be set to, for example, 3, 5, 10, etc. as necessary and/or desired.

In step 135, the content and style may be stored. In one embodiment, the content and style may be saved separately (e.g., one file for the content, a second file for the style sheet). In another embodiment, the style may be included in the head section of the content document or directly on an element via the style attribute.

The calculation of a zoom-state specific layout may be performed by a content layout engine. This may be run on a server at the time of content layout compilation. In another embodiment, the calculation of the zoom-state specific layout may performed by the electronic reading device. Other methods and/or mechanisms for calculating the zoom-state specific layout may be used as necessary and/or desired.

Figure 2:
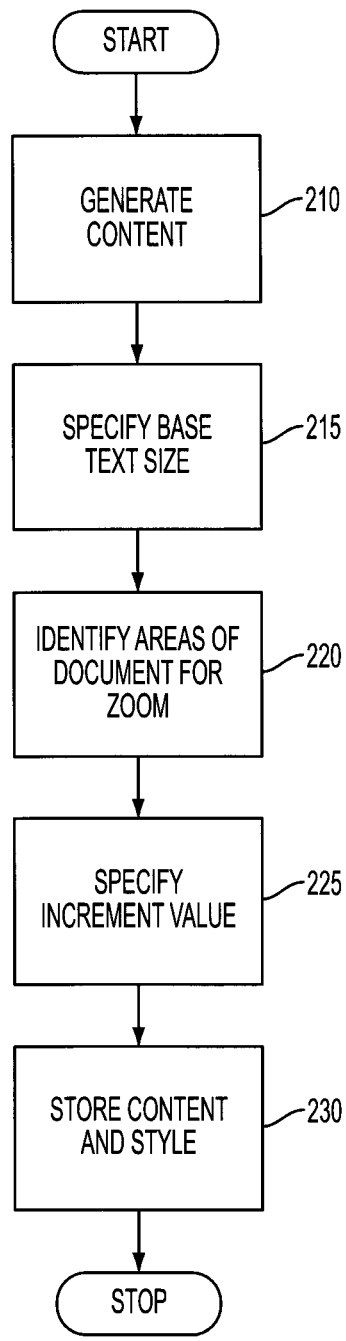
FIG. 2 is a flowchart depicting a method for selective control of zoom adjustments in an electronic publication according to one embodiment.

Referring to FIG. 2, a method for selective control of zoom adjustments in an electronic publication using one increment value according to one embodiment is disclosed. In step 210, content that is for display on an electronic display device is generated. Similar to step 110, any sort of content may be provided.

In step 215, the base text size is specified. This is similar to step 115.

In step 220, at least one portion of the content that will have its zoom properties defined is identified. This is similar to step 120.

In step 225, an increment value is set. In one embodiment, the first increment value may range from a negative value to a positive value specifying a desired increment size. If a negative value is set, the size of the text will decrease. If the value is set to zero, then the base text size will not be increased if the user attempts to zoom on the portion. If a positive value is set, the size of the text will increase. Other portions, however, that have a first increment set, will be zoomed by that value.

Additional increment values may be specified as necessary and/or desired.

In step 230, the content and style may be stored. This is similar to step 135.

The rendering of the content is performed by software executing on an electronic device. Suitable electronic devices include electronic reading devices, including electronic book readers, electronic newspaper readers, electronic paper readers, etc. An example of an electronic display device is disclosed in U.S. patent application Ser. No. 12/481,677, entitled "Flexible Electronic Device And Method Of Manufacture,"

the disclosure of which is incorporated by reference in its entirety. Other examples of electronic reading devices include the Amazon Kindle, the Sony Reader, and the Plastic Logic Reader.

Other examples of electronic devices include computers (desktop, notebook, laptop, tablet, etc.), personal digital assistants (PDAs), music players, telephones, etc. Any electronic device that is capable of rendering electronic content may be used as necessary and/or desired.

Figure 3:
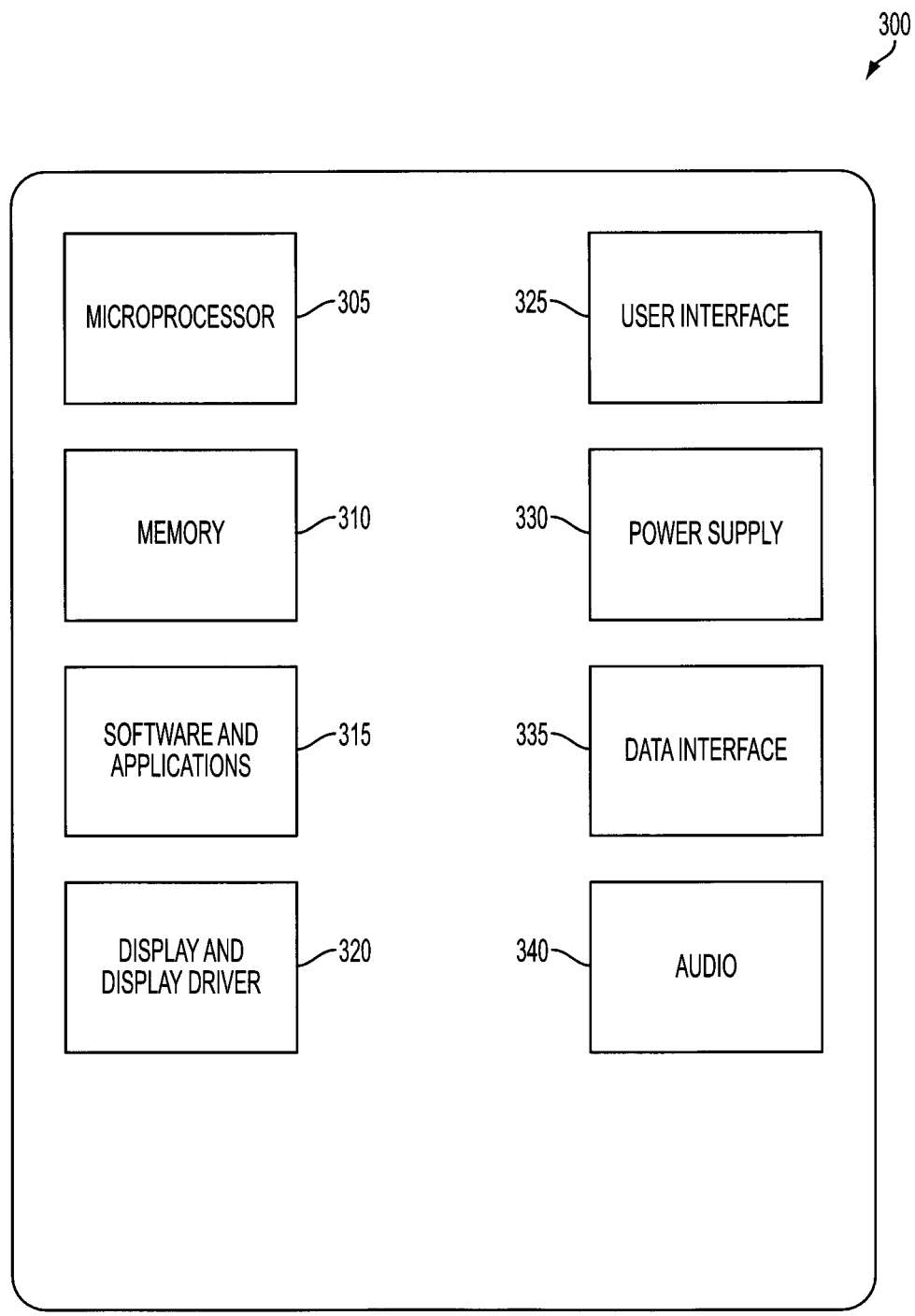
FIG. 3 is a block diagram of an electronic device according to one embodiment of the present invention.

Referring to FIG. 3, a block diagram of an electronic device is provided. In general, electronic device 300 may include microprocessor 305, memory 310, software and applications 315, display and display driver 320, user interface 325, power supply 330, data interface 335, and audio 340. Other features may be provided as necessary and/or desired.

Processor 305 provides the processing power for electronic device 300. Processor 305 may be any suitable processor or integrated circuit, including microprocessors, programmed microprocessors micro-controllers, peripheral integrated circuit elements, CSICs (Customer Specific Integrated Circuit) or ASICs (Application Specific Integrated Circuit), logic circuits, digital signal processors, programmable logic devices such as FPGAs, PLDs, PLAs or PALs, or any other device or arrangement of devices that is capable of performing the function of a microprocessor.

Memory 310 may be any suitable memory, and may be used to store software and applications 315. Memory 310 may be volatile or non-volatile as necessary and/or desired. Memory 310 may include static RAM, dynamic RAM, flash memory, magnetic memory, etc.

In one embodiment, memory 310 may store data files, including electronic content files, style sheets, etc. In one embodiment, software and applications 315 render an image on the display of electronic device 300. In one embodiment, software and applications 315 responds to the "-shadowbox-zoom-deltas" property by allowing a user to zoom certain areas of an electronic document, while preventing the user from zooming other areas of the electronic document.

Display and drivers 320 are provided for displaying characters, graphics, videos, pictures, etc. for the user. The display may be any suitable display, including flexible displays, touch-sensitive displays, etc.

User interface 325 may be provided for the user to interact with electronic device 300. Any suitable input mechanism may be provided. In one embodiment, buttons may be provided. In another embodiment, a touch-sensitive screen may be provided. In still another embodiment, a microphone may be provided to detect speech. In another embodiment, a camera may be provided. Other inputs may be provided as necessary and/or desired, depending on application.

In one embodiment, the user may use user interface 325 to zoom on the content.

Electronic device 300 may be powered by power supply 330, such as a battery, AC power, DC power through an AC adapter, etc.

Electronic device 300 may also be provided with data interface 335. In one embodiment, data interface may be any suitable wired or wireless communication method, including cellular communications, a USB interface, unshielded twisted pair interface, radio frequency (RF), infrared (IR), Bluetooth, near field communication, WiFi (e.g., any suitable IEEE 802.11 protocol), etc.

In one embodiment, electronic device 300 may be provided with audio capability 340.

Figure 4:
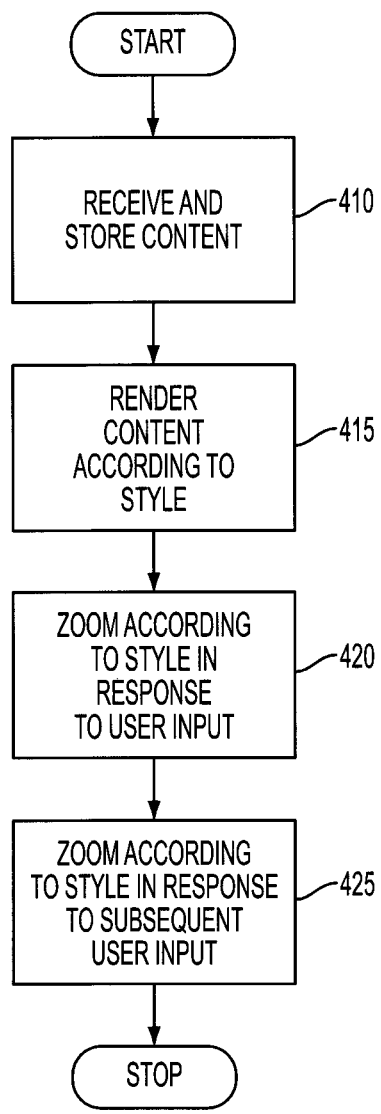
FIG. 4 is a flowchart depicting a method for rendering electronic content on an electronic device according to one embodiment.

Referring to FIG. 4, a flowchart depicting a method of rendering electronic content on an electronic device is disclosed. As noted above, the electronic device may be any device that is capable of rendering electronic content.

In step 410, the electronic device receives and stores content representing, for example, an electronic publication. In one embodiment, the content may be stored in computer memory of the electronic device.

In one embodiment, the content may include several styles, and each style may be specific to a portion of the content. In one embodiment, each style may specify a base text size and a value to increment or decrement the base text size, and one or more subsequent values. In one embodiment, the style may include the "-shadowbox-zoom-deltas" property as described above.

In one embodiment, the base size may be selected such that the text size may be incremented or decremented.

In step 415, the content is rendered on the electronic device according to its at least one style.

In step 420, in response to a user entry indicating a zoom to the next zoom state, the content is rendered according to the "-shadowbox-zoom-deltas" property. Thus, depending on the values set for the "-shadowbox-zoom-deltas" property, the content may remain the same size, or it may increase in size, or decrease in size.

In step 430, in response to a subsequent user entry indicating a zoom to the next zoom state, the content is rendered according to the "-shadowbox-zoom-deltas" property. Thus, depending on the values set for the "-shadowbox-zoom-deltas" property, the content may remain the same size, or it may increase or decrease in size.

Figure 5:
FIG. 5 is an example of a rendering of content at a base text size according to one embodiment.

Referring to FIGS. 5 and 6, an example of the "-shadowbox-zoom-deltas" property use according to an embodiment is shown. In FIG. 5, content is rendered for the user with its base text size. In FIG. 6, in response to a user instruction to zoom by one level, the content is rendered so that the text size for the article increases according to "-shadowbox-zoom-deltas" property for each portion of the content. In this example, the "Front Page" header, which has its "-shadowbox-zoom-deltas" increment set to zero, does not zoom in response to the user request. The text of the article, however, does increase in size.

A system and method for selective control of zoom adjustments in an electronic publication are disclosed. According to one embodiment, a method for selective control of zoom adjustments in an electronic publication may include (1) generating content for display on an electronic reading device; (2) generating at least one style for the content; and (3) storing the content and the at least one style on a computer readable medium. The step of generating at least one style for the content may include identifying at least a portion of the content for which at least one zoom level will be specified; specifying a base text size for the portion of the content; and specifying a first value to increment the base text size to a first zoom state text size. The step of generating at least one style for the content may also include specifying a second value to increment the first zoom state text size to a second zoom state text size.

According to another embodiment, a method for selective control of zoom adjustments in an electronic publication includes (1) generating content for display on an electronic reading device; and (2) generating at least one style for the content. The step of generating at least one style for the content may include identifying at least a portion of the content for which a plurality of zoom levels will be specified; specifying a base text size for the portion of the content; and specifying a value to increment the base text size and subsequent text sizes at each zoom level.

According to another embodiment, a method for rendering an electronic document on an electronic device includes (1) storing content representing an electronic publication in a computer memory of the electronic device, the content including at least one style for a portion of the content, the at least one style including a base text size for the portion of the content and at least a first value to increment the base text size to a first zoom state text size; (2) rendering the contents according to the at least one style; and (3) incrementing the base text size for the portion of the content by the first value in response to a user input to zoom. The method may also include (4) incrementing the first zoom state text size by a second value to a second zoom state text size in response to a user input to zoom. The at least one style further includes the second value to increment the first zoom state text size to the second zoom state text size.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, light pen, keyboard, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method for selective control of zoom adjustments in an electronic publication, comprising:

generating content for display on an electronic reading device;

generating at least one style for the content, using Cascading Style Sheets, comprising:

identifying a first portion of the content for which at least one zoom increment value will be specified, wherein the first portion of the content is a paragraph;

specifying a base text size for the first portion of the content;

applying a Cascading Style Sheets "-shadow-box-zoom-deltas" property to specify a first increment value for the first portion of the content to increment the base text size for the first portion of the content to a first zoom state text size for the first portion of the content, wherein the first zoom state text size for the first portion of the content is equal to the base text size for the first portion of the content plus the first increment value for the first portion of the content;

identifying a second portion of the content for which at least one zoom increment value will be specified, wherein the second portion of the content is at least one of a different paragraph from the first portion of the content, a title, a page number, a header, and a footer;

specifying a base text size for the second portion of the content;

applying a Cascading Style Sheets "-shadow-box-zoom-deltas" property to specify a first increment value for the second portion of the content to increment the base text size for the second portion of the content to a first zoom state text size for the second portion of the content, wherein the first zoom state text size for the second portion of the content is equal to the base text size for the second portion of the content plus the first increment value for the second portion of the content, wherein the first increment value for the second portion of the content is different from the first increment value for the first portion of the content; and storing the content and the at least one style on a computer readable medium.

2. The method of claim 1, wherein the second "-shadow-box-zoom-deltas" first increment value for the second portion of the content is 0.

3. The method of claim 1, wherein the step of generating at least one style for the content, using Cascading Style Sheets further comprises:

applying a Cascading Style Sheets "-shadow-box-zoom-deltas" property to specify a second increment value for the first portion of the content, different from the first increment value for the first portion of the content, to increment the first zoom state text size for the first portion of the content to a second zoom state text size for the first portion of the content, wherein the second zoom state text size for the first portion of the content is equal to the first zoom state text size for the first portion of the content plus the second increment value for the first portion of the content.

4. The method of claim 3, wherein one of the first "-shadow-box-zoom-deltas" increment value for the first portion of the content and second "-shadow-box-zoom-deltas" increment value for the first portion of the content has a value of 0.

5. The method of claim 1, wherein the at least one style inherits to a child element for an element in the at least one portion.

6. The method of claim 1, wherein, for a plurality of portions, each portion has a respective at least one style.

7. The method of claim 1, wherein the content and the at least one style are separate files.

8. The method of claim 1, wherein the at least one style is in a head section of the content.

9. A method for rendering an electronic document on an electronic device comprising:

storing content representing an electronic publication in a computer memory of the electronic device, the content including:

at least one style comprising:

for a first portion of the content, wherein the first portion of the content is a paragraph, a base text size for the first portion of the content and at least a Cascading Style Sheets "-shadow-box-zoom-deltas" property specifying a first increment value for the first portion of the content to increment the base text size for the first portion of the content to a first zoom state text size for the first portion of the content, wherein the first zoom state text size for the first portion of the content is equal to the base text size for the first portion of the content plus the first increment value for the first portion of the content;

for a second portion of the content, wherein the second portion of the content is at least one of a different paragraph from the first portion of the content, a title, a page number, a header, and a footer, a base text size for the second portion of the content and at least a Cascading Style Sheets "-shadow-box-zoom-deltas" property specifying a first increment value for the second portion of the content to increment the base text size for the second portion of the content, wherein the first zoom state text size for the second portion of the content is equal to the base text size for the second portion of the content plus the first increment value for the second portion of the content, wherein the first increment value for the second portion of the content is different from the first increment value for the first portion of the content;

rendering the contents according to the at least one style; and incrementing the base text size for the first portion of the content by the first increment value for the first portion of the content, wherein the first zoom state text size for the first portion of the content is equal to the base text size for the first portion of the content plus the first increment value for the first portion of the content and incrementing the base text size for the second portion of the content by the first increment value for the second portion of the content, wherein the first zoom state text size for the second portion of the content is equal to the base text size for the second portion of the content plus the first increment value for the second portion of the content in response to a user input to zoom.

10. The method of claim 9, further comprising:

incrementing the first zoom state text size for the first portion of the content by a second increment value for the first portion of the content to a second zoom state text size for the first portion of the content wherein the second zoom state text size for the first portion of the content is equal to the first zoom state text size for the first portion of the content plus the second increment value for the first portion of the content, and incrementing the first zoom state text size for the second portion of the content by the first increment value for the second portion of the content to a second zoom state text size for the second portion of the content, wherein the second zoom state text size for the second portion of the content is equal to the first zoom state text size for the second portion of the content plus the first increment value for the second portion of the content in response to a second user input to zoom; and wherein the at least one style further includes the Cascading Style Sheets "-shadow-box-zoom-deltas" property specifying a second increment value for the first portion of the content to increment the first zoom state text size for the first portion of the content to the second zoom state text size for the first portion of the content.

11. The method of claim 9, wherein the first increment value is 0.

12. The method of claim 9, wherein the at least one style inherits to a child element for an element in the at least one portion.

13. The method of claim 9, wherein the content and the at least one style are stored as separate files.

14. The method of claim 9, wherein the at least one style is in a head section of the content.

15. The method of claim 9, wherein the at least one style is in a head section of the content.

* * * * *

UNITED STATES PATENT AND TRADEMARK OFFICE
CERTIFICATE OF CORRECTION

PATENT NO.      : 8,832,548 B2
APPLICATION NO. : 12/563498
DATED           : September 9, 2014
INVENTOR(S)     : Brady Duga et al.

Page 1 of 1

It is certified that error appears in the above-identified patent and that said Letters Patent is hereby corrected as shown below:

In the Claims

Column 9, line 20, delete "[which-at]" and replace with "which at"

Signed and Sealed this
Eighteenth Day of August, 2015

Michelle K. Lee
*Director of the United States Patent and Trademark Office*